United States Patent [19]

Delaby

[11] 4,011,453
[45] Mar. 8, 1977

[54] DEVICE FOR SCANNING A SURFACE FOR USE IN APPARATUS FOR DIAGNOSTIC EXAMINATION BY THE RECORDING OF SCINTILLATIONS

[75] Inventor: Wilfrid Delaby, Epinay-sur-Orge, France

[73] Assignee: U.S. Philips Corporation, New York, N.Y.

[22] Filed: June 5, 1975

[21] Appl. No.: 584,153

[30] Foreign Application Priority Data

June 6, 1974 France .............................. 74.19484

[52] U.S. Cl. ........................... 250/363 S; 250/445 T
[51] Int. Cl.² ......................................... G01M 21/34
[58] Field of Search ............. 250/490, 445 T, 363 S

[56] References Cited
UNITED STATES PATENTS

| | | | |
|---|---|---|---|
| 2,680,199 | 6/1954 | Abel | 250/445 T |
| 3,803,417 | 4/1974 | Kok | 250/490 |

Primary Examiner—Harold A. Dixon
Attorney, Agent, or Firm—Frank R. Trifari; Ronald L. Drumheller

[57] ABSTRACT

A device for scanning a flat surface having a given orientation between two arbitrary orthogonal planes P and P', the device comprises:

- a carrier arm whereon the detector can slide and be orientated, the said detector carrier arm itself being arranged to be slidable on an intermediate arm which constitutes, in conjunction with the detector carrier arm, a plane which is parallel to the plane P,

- A carrier arm whereon the intermediate arm is arranged to be slidable and which constitutes, in conjunction with the latter, the plane P'' which is perpendicular to the planes P and P' the said carrier arm being provided with means for displacement in a plane parallel to the plane P'.

2 Claims, 3 Drawing Figures

DEVICE FOR SCANNING A SURFACE FOR USE IN APPARATUS FOR DIAGNOSTIC EXAMINATION BY THE RECORDING OF SCINTILLATIONS The invention relates to a device for scanning a surface, and furthermore relates to the use of this device in apparatus whereby medical diagnosis is obtained by the recording of scintillations.

Devices are known already whereby this object is achieved; for the present application these apparatus are referred to as scanning gamma cameras (scintillation scanners). These apparatus generally do not permit scanning in a plurality of planes situated at an angle with respect to each other. Moreover, these apparatus are usually of a heavy construction and are installed at the premises of an isotope department. As a result, the said apparatus cannot be used for examining persons who cannot be transported or who are hospitalized, or for emergency cases. On the other hand, the said apparatus are not adapted to the structure of the isotope departments. Radiologists more and more wish to change over to the static recording of scintigrams. Another consideration is the forthcoming availability of new treatment and display means for the radiologist. Finally, nowadays substantial importance is attached to the possibility of recording scintigrams by fast scanning in a plurality of planes, for example, in vertical and horizontal planes, and also in inclined planes which enclose, for example, an angle of 45°.

An embodiment of a device according to the invention which can notably be used for apparatus for diagnostic examination by recording scintillations is light and mobile. The said device can be adapted to the fetching of data which are for example, magnetically recorded; the device enables the scanning of a surface which has a given orientation out of a number of possible orientations between two arbitrary orthogonal planes P and P'. The device according to the invention is characterized in that it comprises the following components:

a scanning detector carrier arm accomodating a slidable and orientatable detector, the said arm being slidably coupled to at least one intermediate arm which, in conjunction with the said detector carrier arm, determines a plane which is parallel to the plane P;

a carrier arm whereon the said intermediate arm is arranged to be slidable and which determines, in conjunction with this intermediate arm, a plane P'' which is perpendicular to the planes P and P', the said carrier arm comprising means for displacement in a plane parallel to the plane P';

and means enabling:

a. the detector carrier arm to be secured in successive positions situated in a flat surface which is homographic with respect to the surface to be scanned, the said positions being obtained by relative displacements of the said detector carrier arm on the intermediate arm, and by displacement of this intermediate arm on the carrier arm, b. the sliding of the said detector on the detector carrier arm in each of the said successive positions of the said arm for each orientation of this arm with respect to the surface to be scanned.

The invention will be described in detail hereinafter with reference to the drawing.

Figure 1:
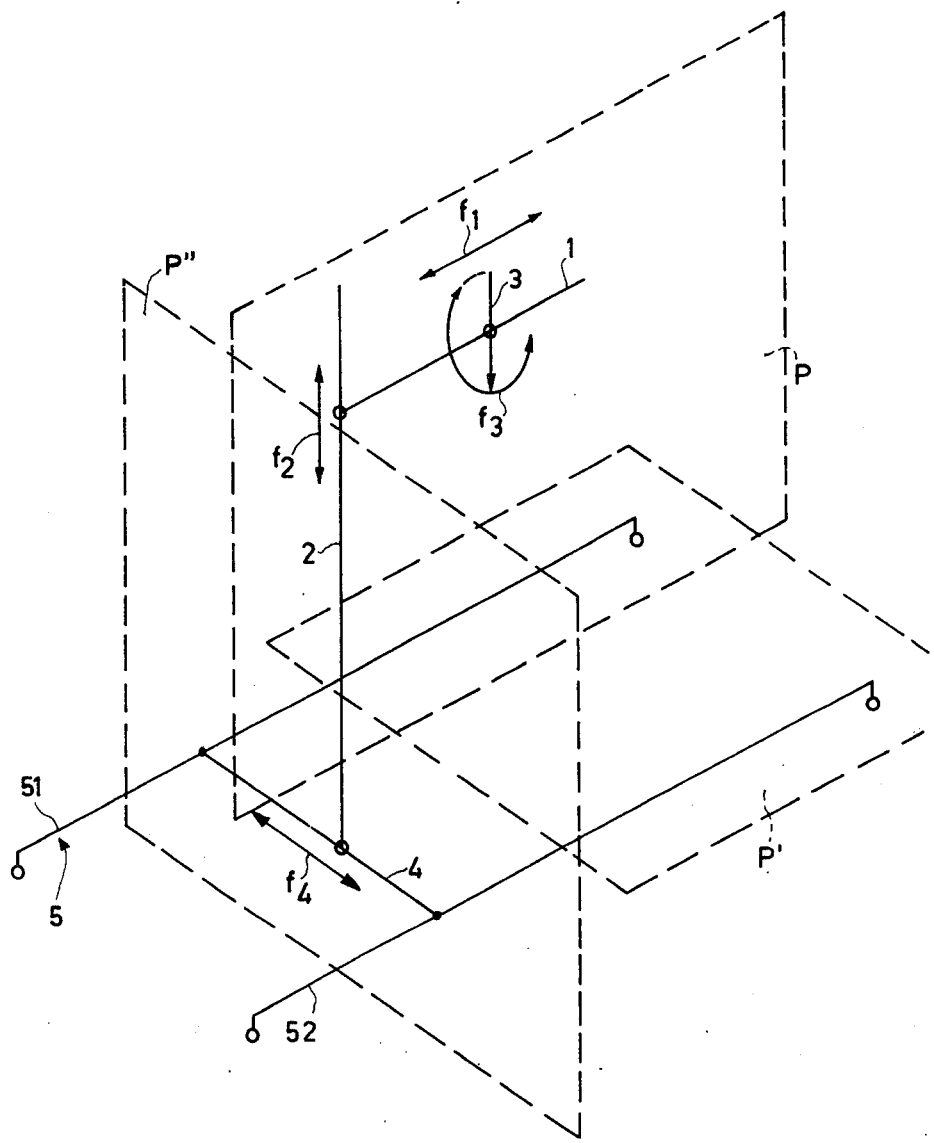
FIG. 1 shows a circuit diagram of a device according to the invention.

FIG. 1 shows three planes P, P' and P'' which are perpendicular to each other. Two arms 1 and 2 are situated in the plane 2. A scanning detector, denoted by the reference 3, can be displaced and orientated on the arm 1; this is denoted by the arrows $f1$ and $f3$. The arm 1, being a detector carrier arm, is slidable on the arm 2 which constitutes the intermediate arm, the said movement being indicated by the arrow $f2$. In the plane P'' the arm 2 and an arm 4 are situated, the arm 4 being a carrier arm. The arm 2 is slidable on the arm 4; this is denoted by the arrow. Finally, the carrier arm 4 is provided with displacement means, for example, in the form of a slide 5 in the plane P'.

As is shown, the arms 1, 2 and 4 are in fact perpendicular to each other (the arms 1 and 4 being horizontal, and the arm 2 being vertical), while the detector can be orientated in a plane parallel to the plane P''; the slide 5, being displaceable in a horizontal plane, is shown as being formed by two parallel transverse portions 51 and 52 wherebetween the arm 4 is secured. The plane P' is, therefore, a horizontal plane. The planes P and P'' are, therefore, vertical planes. This arrangement is simplest and very well meets the object of the invention, as this will be demonstrated hereinafter. Of course, other arrangements can also be realized, notably arrangements which serve to vary the angles formed between the three arms in their relevant planes. However, these other arrangements are much more complex and offer no additional advantages.

The operation of the device is as follows:

when scanning is to take place in a horizontal plane, the intermediate arm 2 is stepwise displaced in the carrier arm 4, and for each position of the said intermediate arm a translation movement is imparted to the detector 3 on the detector carrier arm 1, the said detector 3 then being orientated in the vertical plane towards the surface to be scanned;

if scanning is to take place in a vertical plane, the detector carrier arm 1 is step wise displaced on the intermediate arm 2, for each position of the detector carrier arm a translation movement being imparted to the detector on the said detector carrier arm the said detector 3 then being orientated in the horizontal plane towards the surface to be scanned;

if scanning is to take place in an inclined plane which encloses an angled with the horizontal plane, the intermediate arm 2 and the detector carrier arm 1 are simultaneously step wise moved; when for one step the traject travelled by the intermediate arm is denoted by $b$, and the corresponding traject travelled by the detector carrier arm is denoted by $a$, $b/a$ equals $\tan\alpha$; as was already noted, in each position occupied by the detector carrier arm a translation movement is imparted to the detector on the said arm, the detector then being orientated towards the surface to be scanned and enclosing an angle $\beta$ with the horizontal plane which is the complement of the angle $\alpha$.

The successive positions occupied by the detector carrier arm are situated in a plane which is parallel to the plane to be scanned, the trajects completed, corresponding to one step, determining the value of the scanning intermediate lines; in the two former cases, the traject completed directly determines the value of the intermediate line; in the third case, $a = p$ cosine $\alpha$ and $\alpha = p$ sine $\alpha$, $p$ being the value of the intermediate line.

The device also enables the determination of successive positions on the detector carrier arm which are not situated in the same plane, but in the space; to this end, it is sufficient to vary the ratio $b/a$ for each step by way of a given programming as from the curve which bounds the shape of the surface to be scanned in a vertical section; it is even possible to vary for each step the angle enclosed by the detector and the horizontal plane, this angle always being the complement of the angle $\alpha$; however in that case the angle $\alpha$ is determined by the angle enclosed by the horizontal plane and the tangent in the vertical plane in the point of incidence of the beam, emitted by the detector, on the surface to be scanned.

Arrangements of this kind do not present any problem to those skilled in the art, and will not be elaborated herein.

Figure 2:
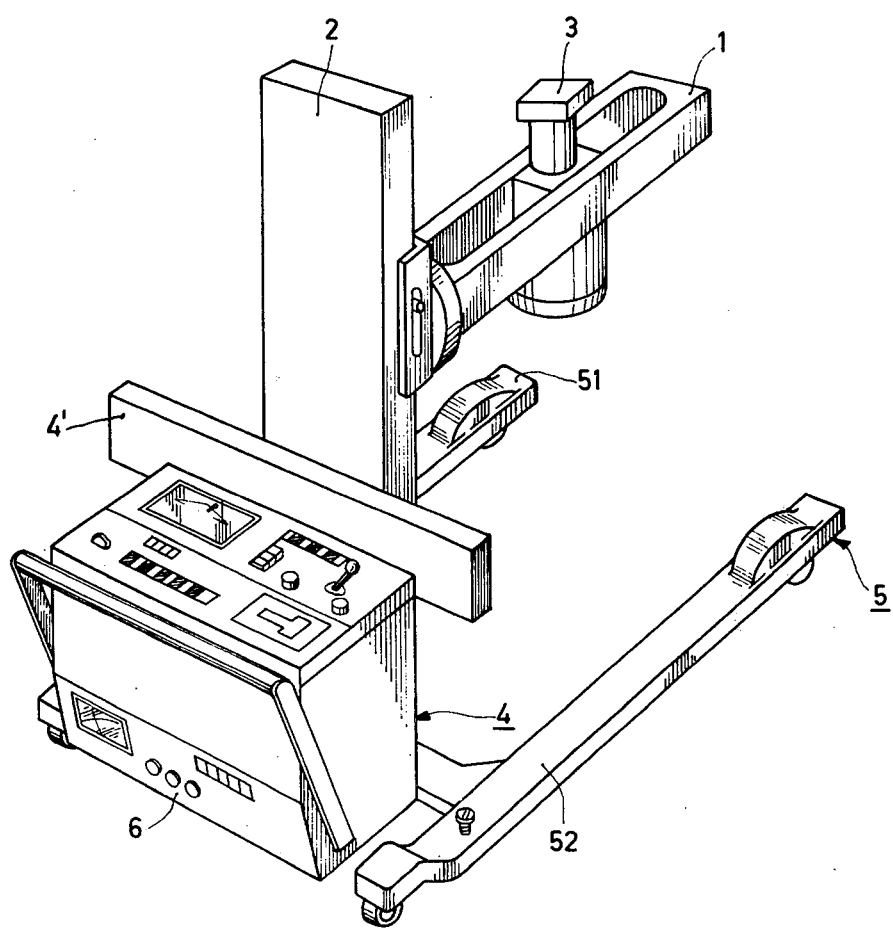
FIG. 2 is a perspective view of the detection section of an apparatus producing a diagnosis by the recording of scintillations.

FIG. 2 is a perspective view of the scanning section of an apparatus producing a diagnosis by way of the recording of scintillations. FIG. 2 shows the detector carrier arm 1 and the detector 3, the intermediate arm 2, the slide 5 and the two transverse portions 51 and 52 thereof; in this embodiment the arm 4 is in fact doubled by means of a reinforcement arm 4' which is parallel to the arm 4 and which constitutes a carrier frame in conjunction with the latter. Because of this arrangement, it is possible to eliminate any sagging of the intermediate arm 2. The console for controlling the movements is denoted by the reference 6.

Figure 3:
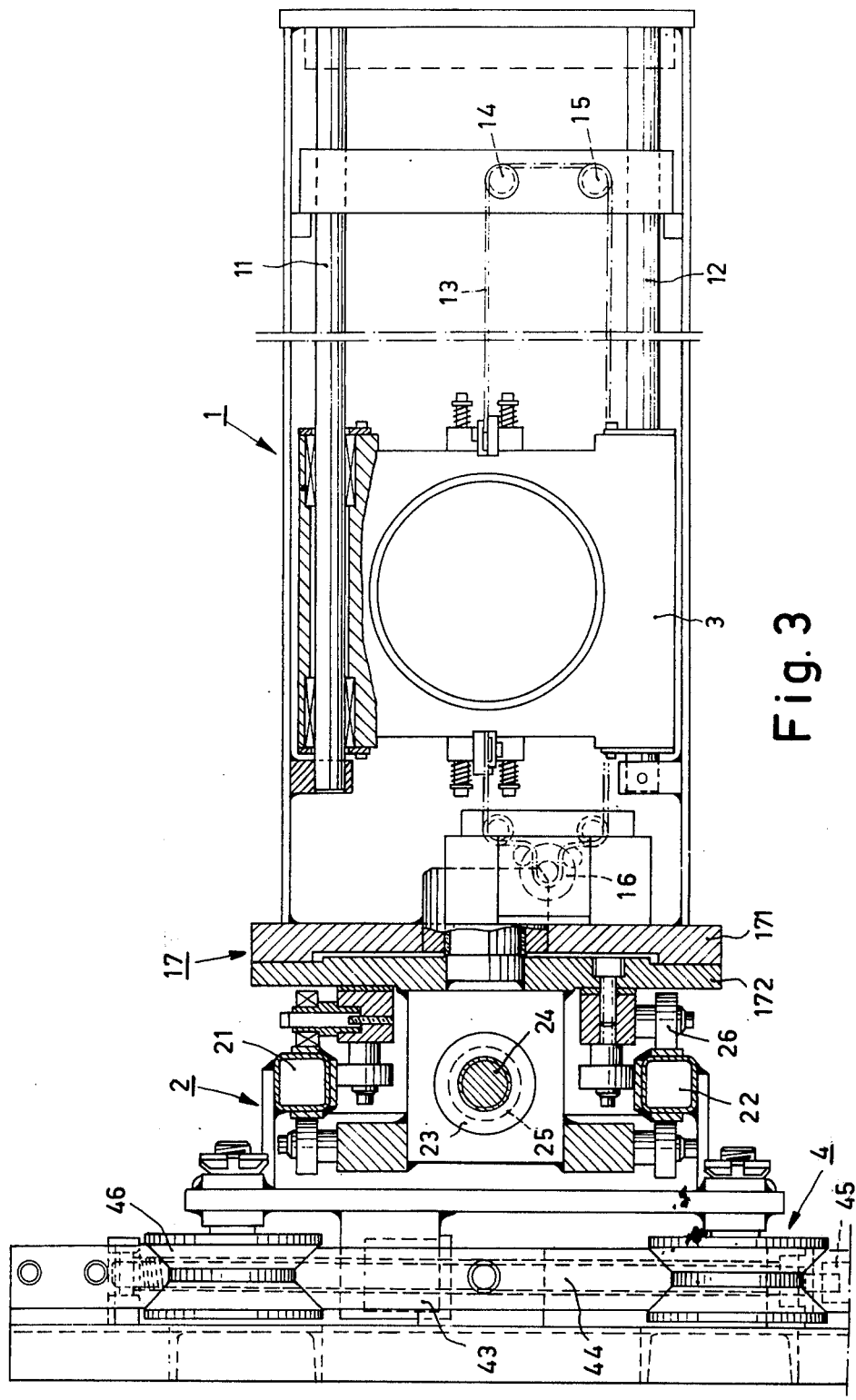
FIG. 3 is a horizontal sectional view of the detection section at the level of the detector carrier arm.

FIG. 3 is a horizontal sectional view of the detection section shown in FIG. 2, at the level of the detector carrier arm 1. The arm 1 is actually formed by two parallel guide members 11 and 12 whereon the body of the detector 3 is arranged to be slidable by way of suitable means; on both sides of this detector body the two ends of a toothed belt 13 are secured which controls the sliding movement of the detector; the said belt, following a traject determined by, for example, the pulleys 14 and 15, is driven by a gearwheel provided on the shaft of a motor 16 which is arranged between the two guide members 11 and 12 on the side of the carrier seat and which is secured to these members 11 and 12.

With reference to FIG. 1 it was already stated that the detector can be orientated on the arm 1; in this embodiment the detector is actually not freely rotatable on the arm 1, but rather the arm 1 is free rotatable, via its section which is displaced by the slide, the assembly thereof being described hereinafter. To this end, the two members 11 and 12 are rigidly connected, on the side of the carrier seat, to the movable plate 171 of the double friction plate 17, the fixed plate 172 of this plate 17 being rigidly connected to the section of the arm 1 which is displaced by way of the slide. The plate 171 is provided on its circumference with at least five notches.

a vertical orientation for the scanning of horizontal surfaces situated below the detector;

two horizontal orientations for scanning vertical surfaces situated either to the left or to the right of the detector;

two inclined orientations, enclosing an angle 8 with the horizontal plane, for scanning inclined surfaces situated either to the right or to the left of the detector and enclosing an angle $\alpha$ with the horizontal plane which is the complement of the angle $\beta$.

The double plate 17 comprises devices for locking the blocking of the movable plate 171, i.e. of the arm 1 in the positions defined by the notches. The said locking and blocking devices are not shown in the drawing, but their construction willl be obvious to those skilled in the art.

The movement $f2$ is a sliding movement of the detector carrier arm on the intermediate arm 2; this intermediate arm 2 is actually formed by two parallel guide members 21 and 22 whereon the slide portion of the arm 1 can slide via rollers, for example, the roller 26; the movement is controlled by way of a screw 23 which is driven in a vertical plane by a threaded rod 24 which is coupled to the end of the shaft of a motor which assumes the position indicated by 25. This motor is arranged between two guide members 21 and 22 and is rigidly connected thereto. The slide portion of the detector carrier arm thus essentially comprises the roller (rollers) 26 and the screw 23; the said portion supports the fixed plate 172 of the double friction plate 17.

The movement $f4$ is a sliding movement of the intermediate arm on the arm 4' of the carrier frame formed by the arms 4 and 4'. This frame is rigidly connected to the slide 5, and the said arms 4 and 4' constitute two parallel guide members which enable the slide portion of the intermediate arm to slide via rollers such as the roller 46. The movement is controlled by way of a screw 43 which is driven in a horizontal plane by a threaded rod 44 which is coupled to the end of the shaft of a motor 45; this motor is rigidly connected to the carrier frame and is situated between the arms 4 and 4'. The slide portion of the intermediate arm thus essentially comprises the roller (rollers) 46 and the screw 43; the said portion is rigidly connected to the two guide members 21, 22 constituting the intermediate arm 2.

Therefore, the arrangement of the assembly on the movable slide 5 on the one hand, and the provision of at least five notches for the carrier arm on the other hand, enable access to the bed of a patient from an arbitrary side. Moreover, the combination of the four movements $f1, f2, f3, f4$ allows the most comfortable position to be chosen for the patient; this facility is not offered by the known apparatus which, because they are substantially less flexible, often require the patient to be placed in a position which is rather uncomfortable to say the least. Because of the said advantages, the apparatus according to the invention represents substantial progress in a technical as well as a humane respect.

The operation of the three motors can be controlled on the console 6. The control motions are electronically determined, and the circuits to be used for this purpose can be readily realized. The motors are preferably step motors to allow the use of so-termed "all or nothing" circuits; notably when the value of the scanning intermediate line is denoted by $\rho$, the motors controlling the displacement of the detector carrier arm and of the intermediate arms serve to realize the displacements over distances equalling $p$ for the analysis of horizontal or vertical scanning surfaces, and equal to $p$ sine $\alpha$ and $p$ sine $\beta$ for the analysis of inclined scanning surfaces which enclose an angle $\alpha$ with the horizontal plane.

The double friction plate 17 is manually operated, and it is, of course, possible to provide seven or nine (or more) notches in the movable plate thereof so as to determine two, three (or more) angle values in this manner.

The detector is electrically connected to at least one recording device (operating magnetically or photographically, etc). The numerous possible uses of the apparatus enable easy processing of the results obtained by arbitrary means which are for the operator of the apparatus, to decide.

In an apparatus as described above, the detector is provided with a lens shield which is calculated for an energy of $\leq$ 200 KeV; the total weight of the detector and the preamplifier amounts to 3 kg, while the total weight of the lead shield and the collimator amounts to 17 kg. The assembly of the movable portion and the fixing elements thereof is estimated to be approximately 25 kg. The detector can occupy three orientations: a vertical, a horizontal and an inclined orientation according to an angle $\alpha$ (in this latter case = 37°). The apparatus can be readily adapted to the bed of a patient; the largest width of the apparatus is 78 cm, the largest length being 160 cm and the largest height being 170 cm. The traject completed by the intermediate arm on the carrier arm is 50 cm, while the traject of the detector on the detector carrier arm amounts to 40 cm. The traject completed by the detector carrier arm on the intermediate arm 4 is 90 cm. The value of the scanning intermediate lines is made to be compatible with the system used for displaying the recording made; the scanning speed can vary between 0 mm/s and 50 mm/s.

The foregoing description was merely given by way of example, and does not restrict the scope of the invention in any way without departing from the scope of the invention, a plurality of variants can be realized, notably as regards the use of the device.

What is claimed is:

1. Apparatus for scanning a body for scintillations along a surface having any one of a plurality of different orientations which are parallel to a first horizontal direction, said apparatus comprising:

a scintillation detector;

a detector carrier arm assembly along which said detector is movable in a first horizontal direction, said detector being oriented perpendicular to said first horizontal direction and said detector carrier arm assembly being axially rotatable about said first horizontal direction, so that said detector may be oriented in any one of a plurality of different directions which are perpendicular to said first horizontal direction;

an intermediate arm assembly along which said detector carrier arm assembly is movable in the vertical direction;

a carrier arm assembly along which said intermediate arm assembly is movable in a second horizontal direction perpendicular to said first horizontal direction;

a first drive motor mounted on said carrier arm assembly and coupled to said intermediate arm assembly for moving said intermediate arm assembly in said second horizontal direction;

a second drive motor mounted on said intermediate arm assembly and coupled to said detector carrier arm assembly for moving said detector carrier arm assembly in the vertical direction; and a third drive motor mounted on said detector carrier arm assembly and coupled to said detector for moving said detector in said first horizontal direction.

2. Apparatus as defined in claim 1 and further comprising a double friction plate rotatably mounting said detector carrier arm assembly to said intermediate arm assembly, said double friction plate having at least five predetermined detent positions corresponding to said detector being oriented in the vertical direction, in two opposing horizontal directions and in two inclined directions which respectively form the same angle with said two opposing horizontal directions.

* * * * *

UNITED STATES PATENT AND TRADEMARK OFFICE
CERTIFICATE OF CORRECTION

PATENT NO. : 4,011,453
DATED : March 8, 1977
INVENTOR(S) : WILFRID DELABY

It is certified that error appears in the above-identified patent and that said Letters Patent are hereby corrected as shown below:

Column 2, line 51, "angled" should be --angle $\alpha$ --

Column 4, line 60, "arms" should be --arm--

Column 5, line 11, "KeV" should be --keV--

Signed and Sealed this

Tenth Day of May 1977

[SEAL]

Attest:

RUTH C. MASON
*Attesting Officer*

C. MARSHALL DANN
*Commissioner of Patents and Trademarks*